B. M. W. HANSON.
VERTICAL SURFACE GRINDING MACHINE.
APPLICATION FILED JULY 31, 1918.

1,392,325.

Patented Oct. 4, 1921.
13 SHEETS—SHEET 1.

INVENTOR
Bengt M. W. Hanson
BY S. Jay Teller
ATTORNEY

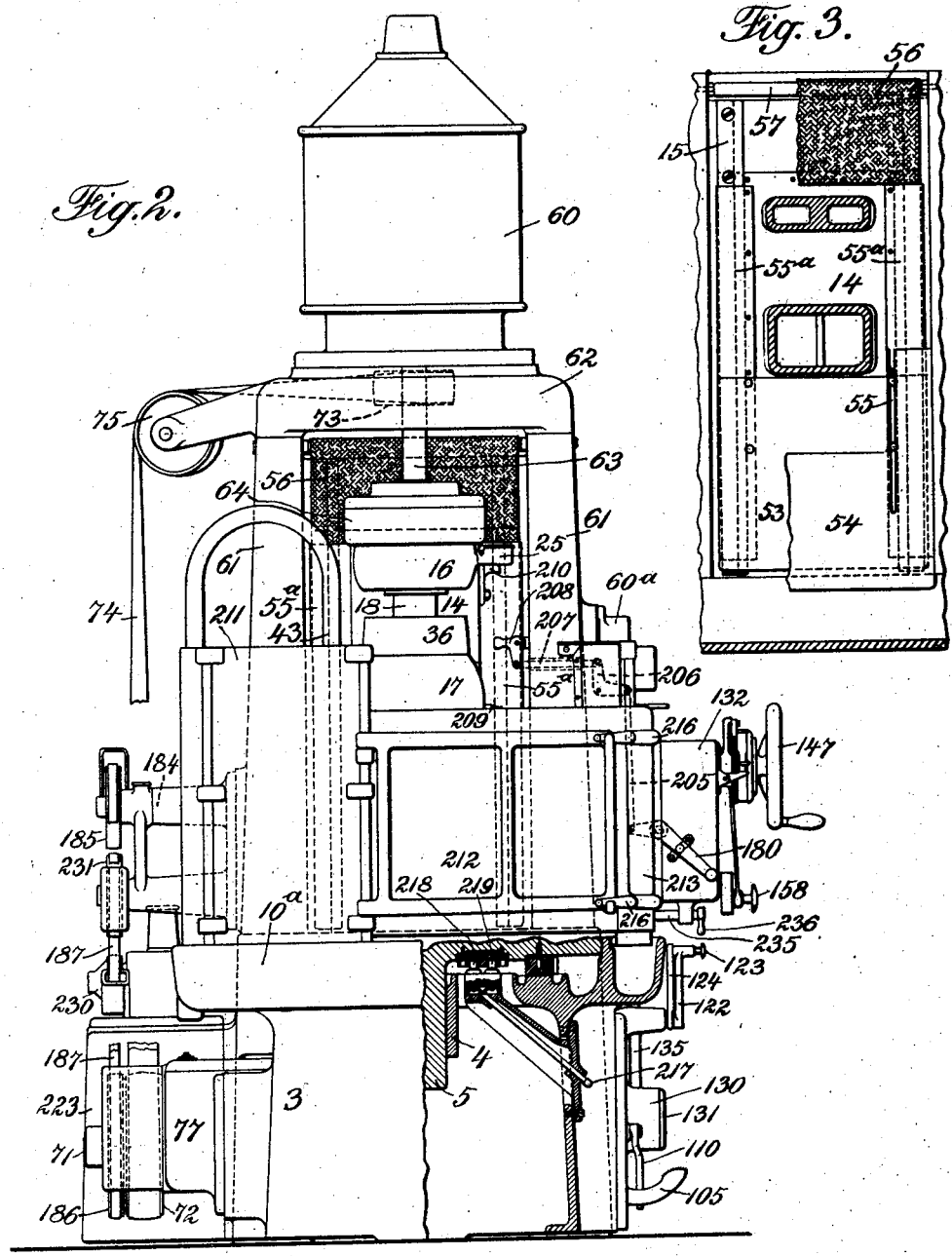

B. M. W. HANSON.
VERTICAL SURFACE GRINDING MACHINE.
APPLICATION FILED JULY 31, 1918.
1,392,325.
Patented Oct. 4, 1921.
13 SHEETS—SHEET 3.
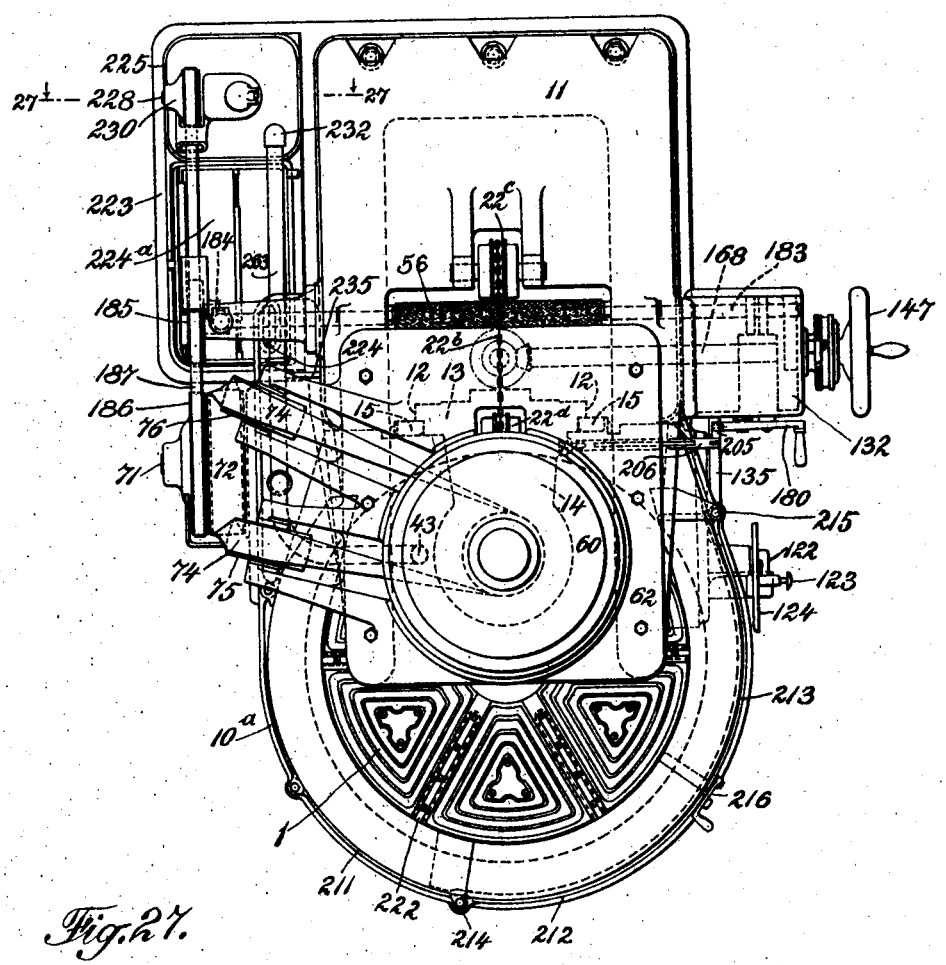
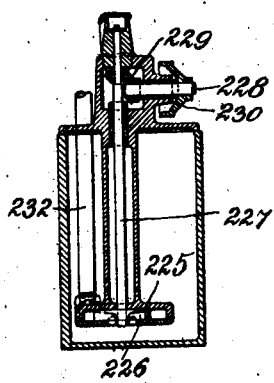
INVENTOR
Bengt M. W. Hanson
BY S. Jay Teller
ATTORNEY

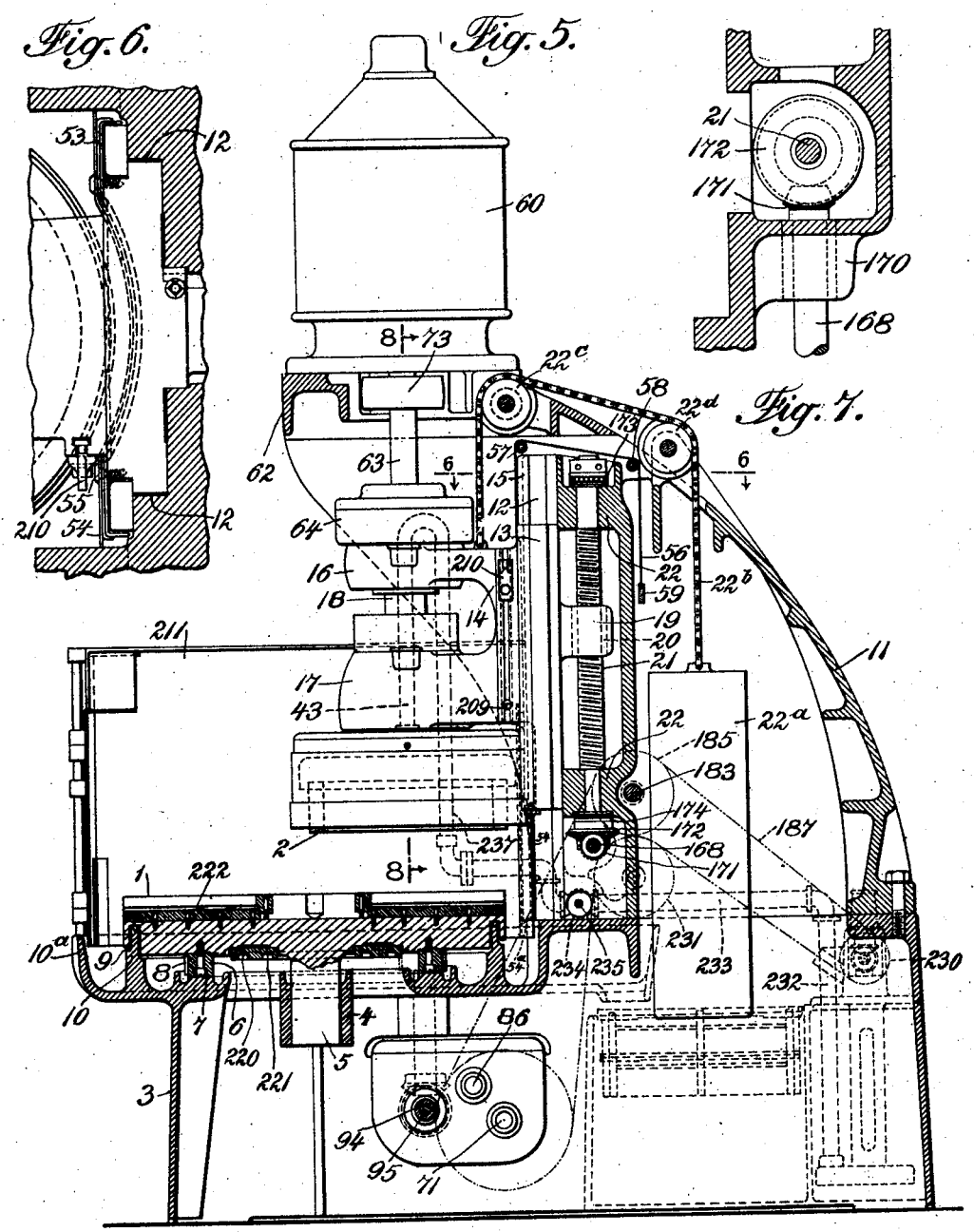

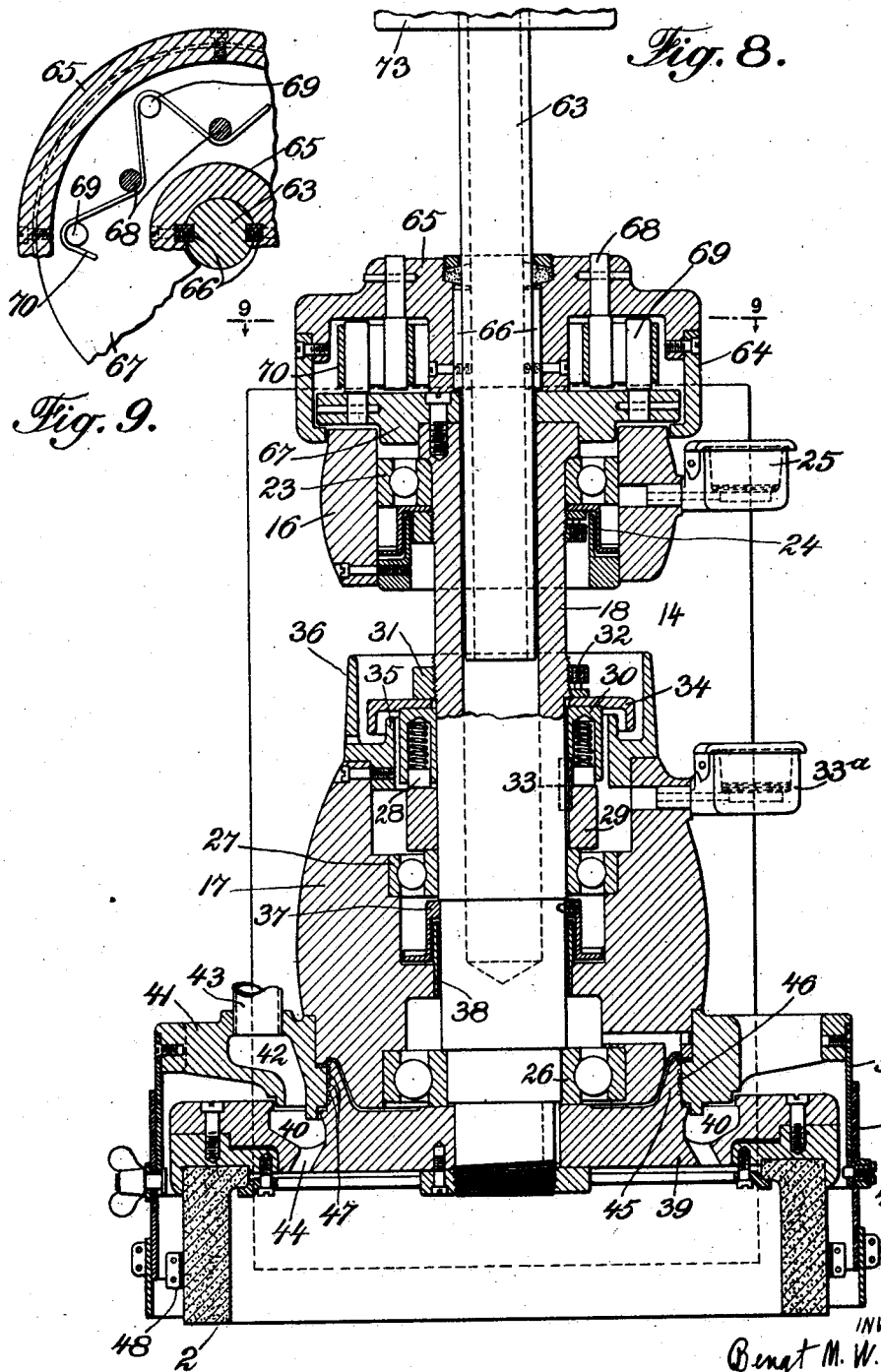

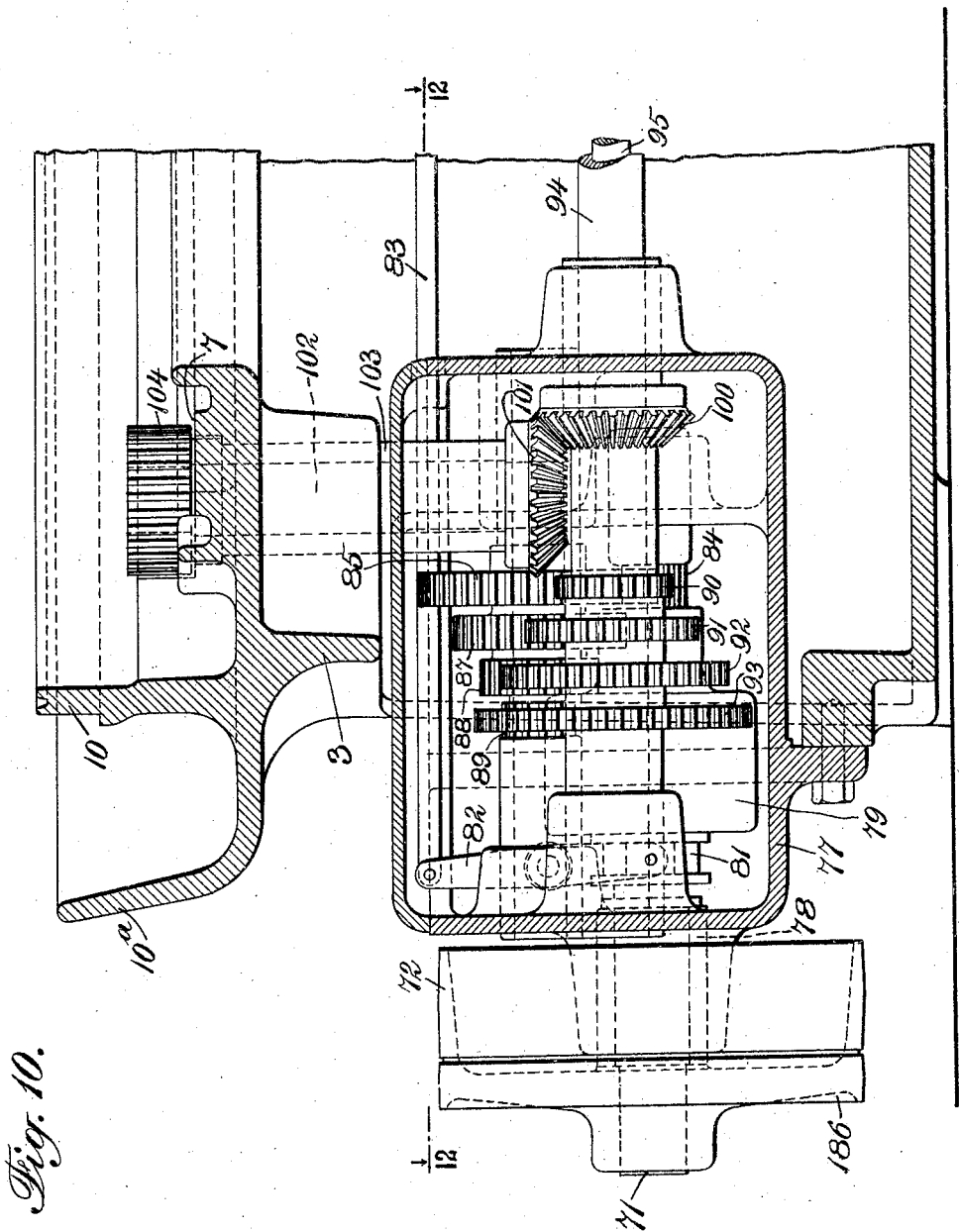

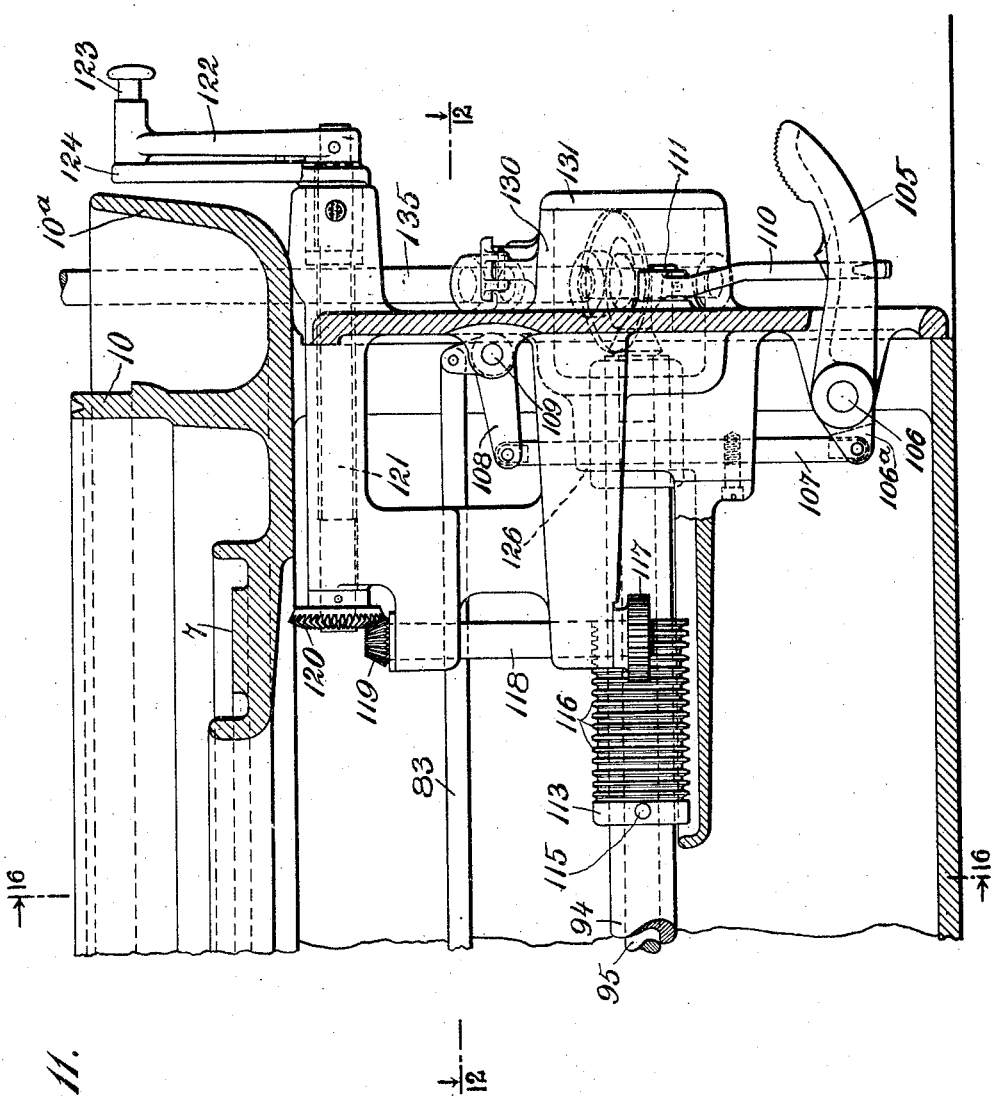

B. M. W. HANSON.
VERTICAL SURFACE GRINDING MACHINE.
APPLICATION FILED JULY 31, 1918.
1,392,325.
Patented Oct. 4, 1921.
13 SHEETS—SHEET 8.
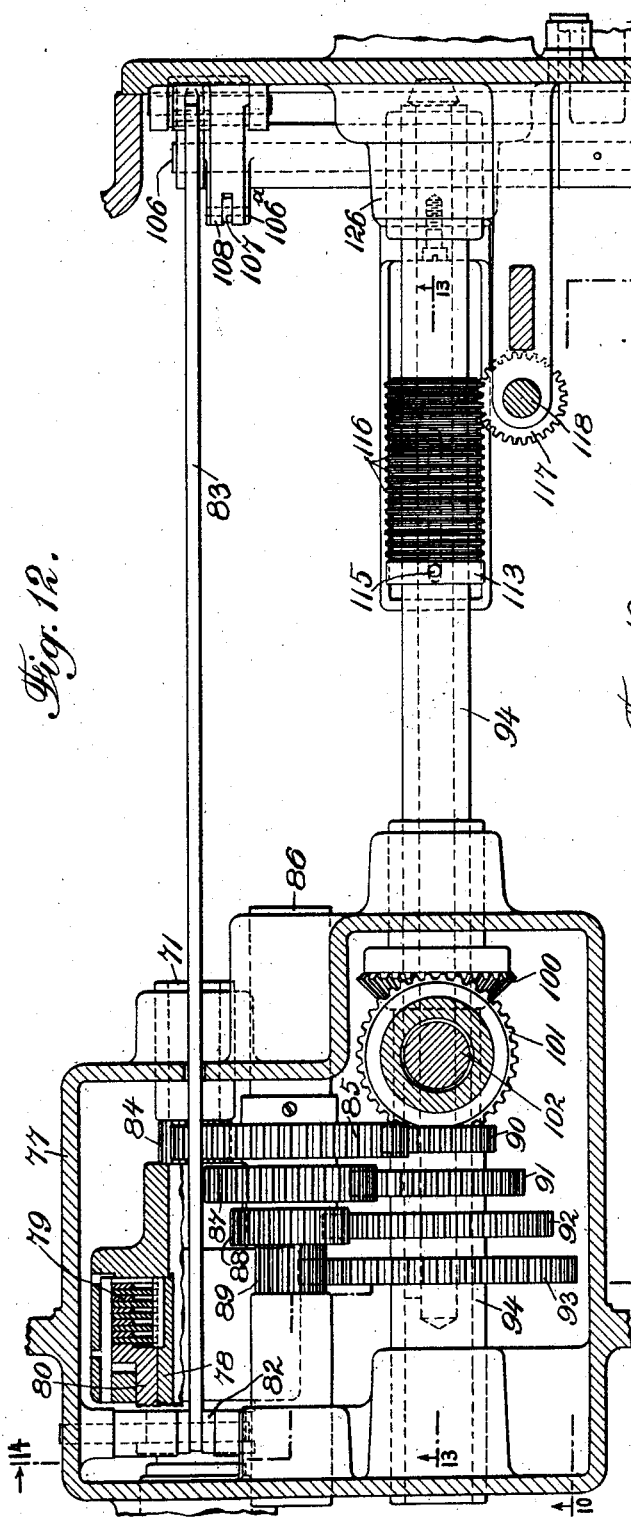
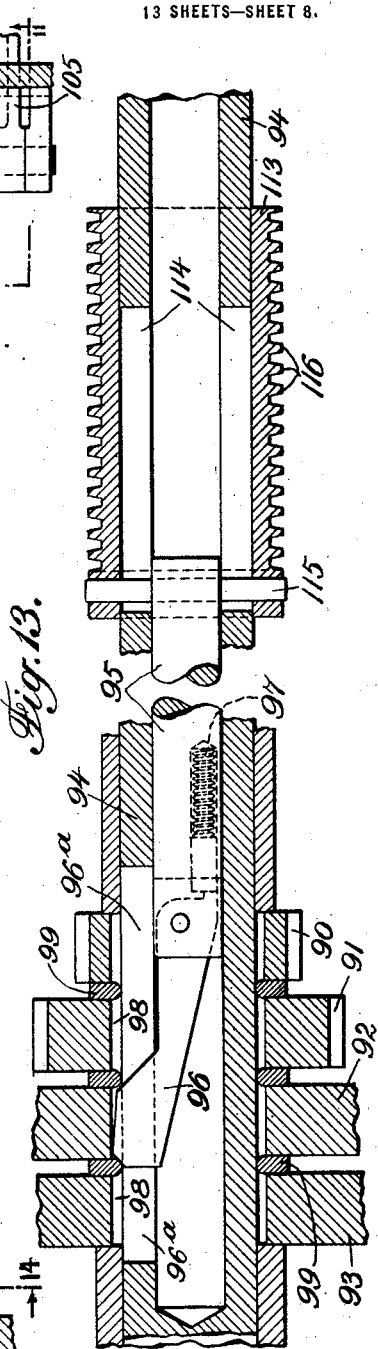
INVENTOR
Bengt M. W. Hanson
BY S. Jay Teller
ATTORNEY

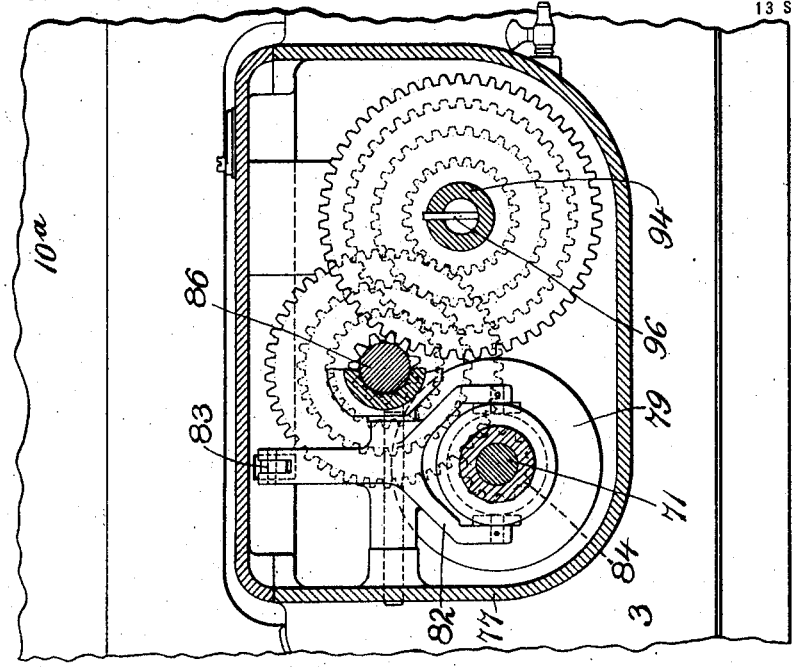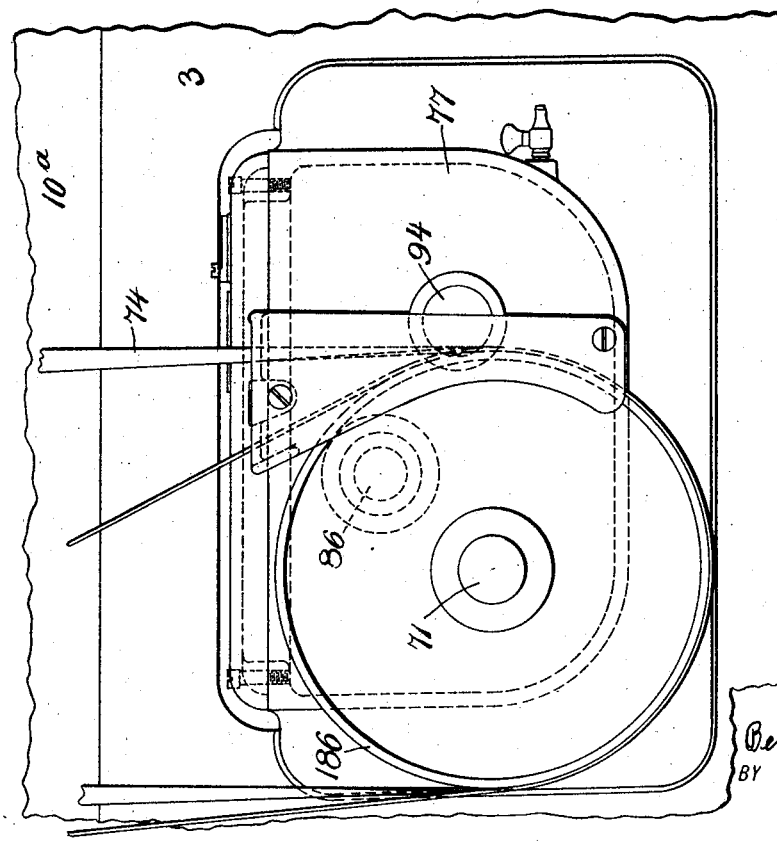

B. M. W. HANSON.
VERTICAL SURFACE GRINDING MACHINE.
APPLICATION FILED JULY 31, 1918.
1,392,325.
Patented Oct. 4, 1921.
13 SHEETS—SHEET 10.
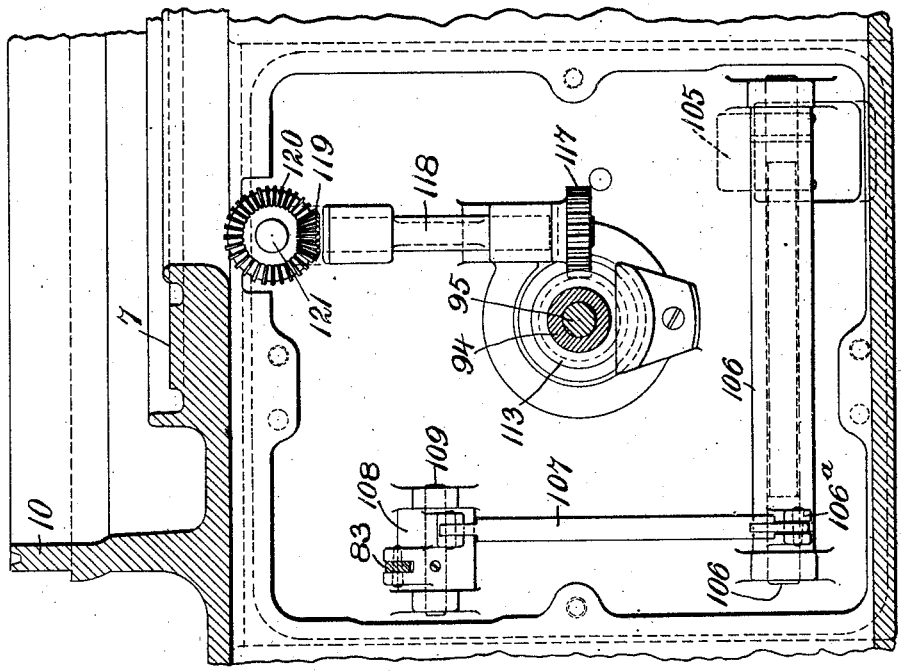
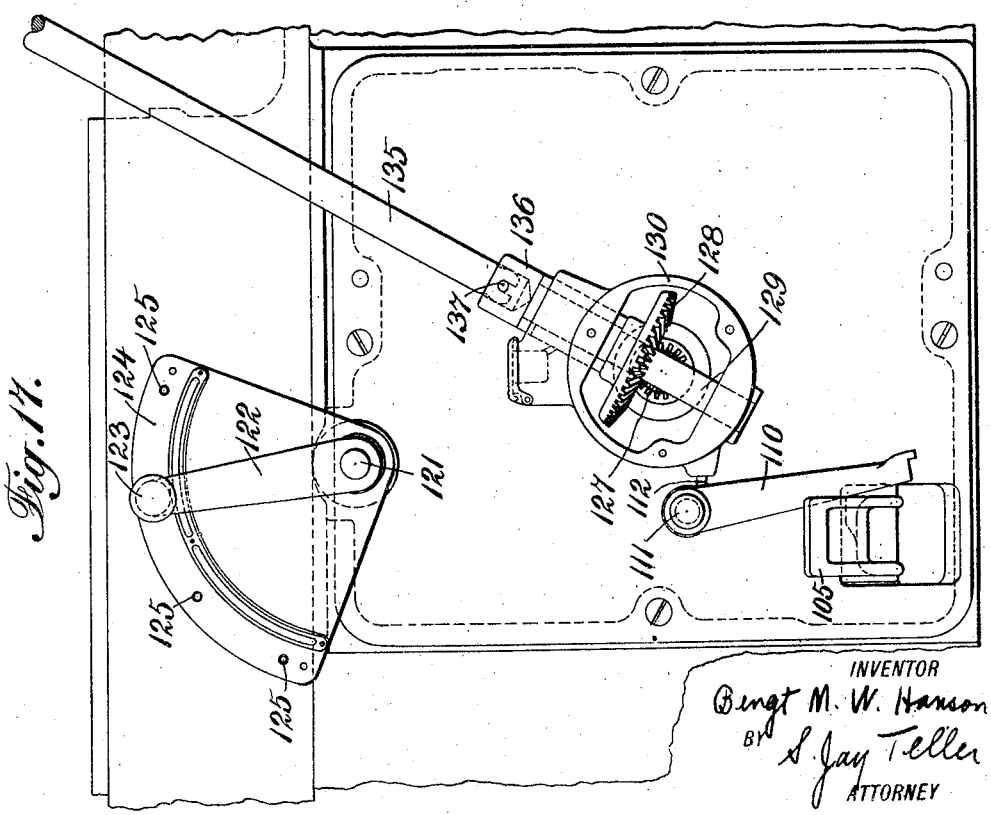
INVENTOR
Bengt M. W. Hanson
BY S. Jay Teller
ATTORNEY B. M. W. HANSON.
VERTICAL SURFACE GRINDING MACHINE.
APPLICATION FILED JULY 31, 1918.

1,392,325.

Patented Oct. 4, 1921.
13 SHEETS—SHEET 11.

INVENTOR
Bengt M. W. Hanson
BY S. Jay Teller
ATTORNEY

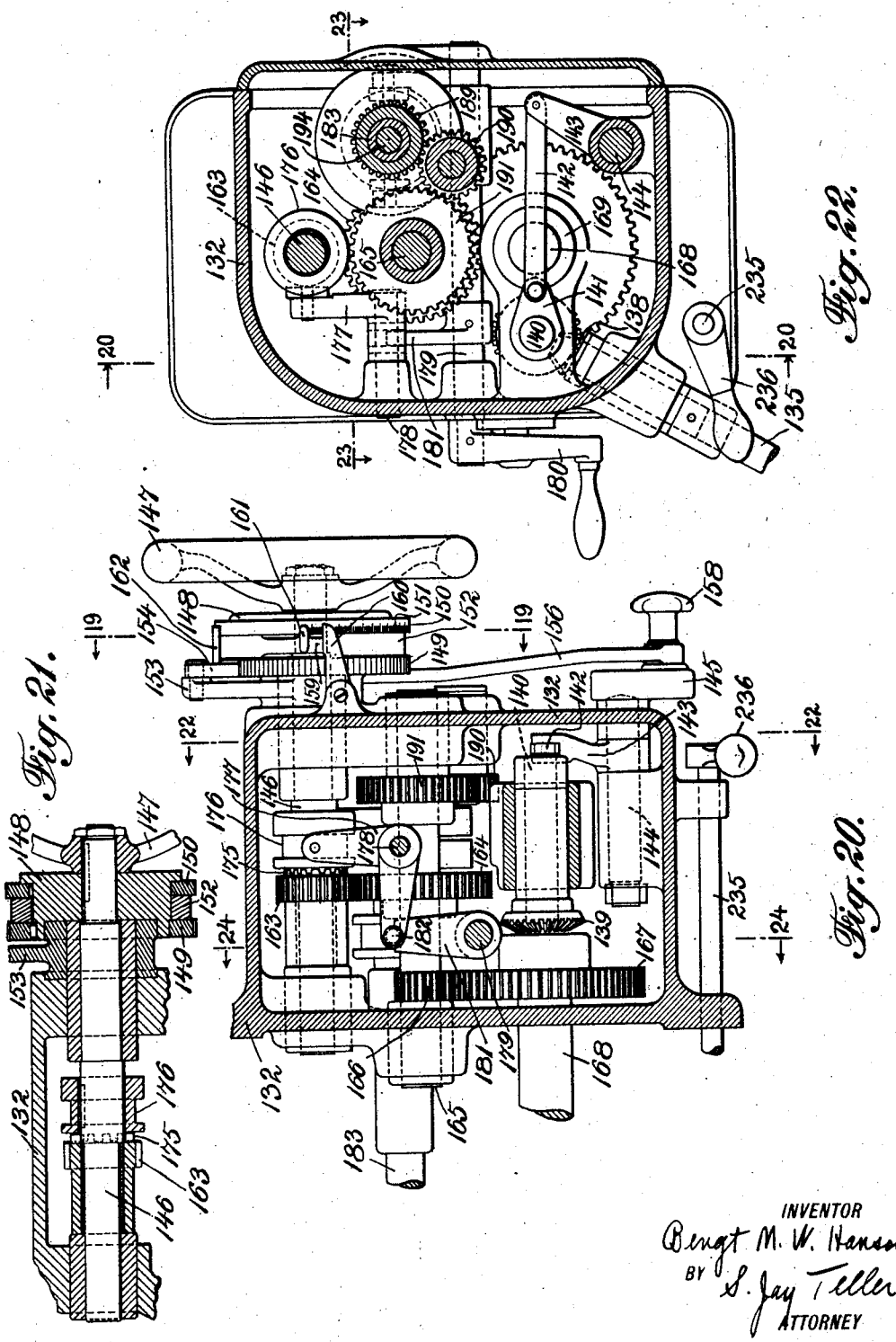

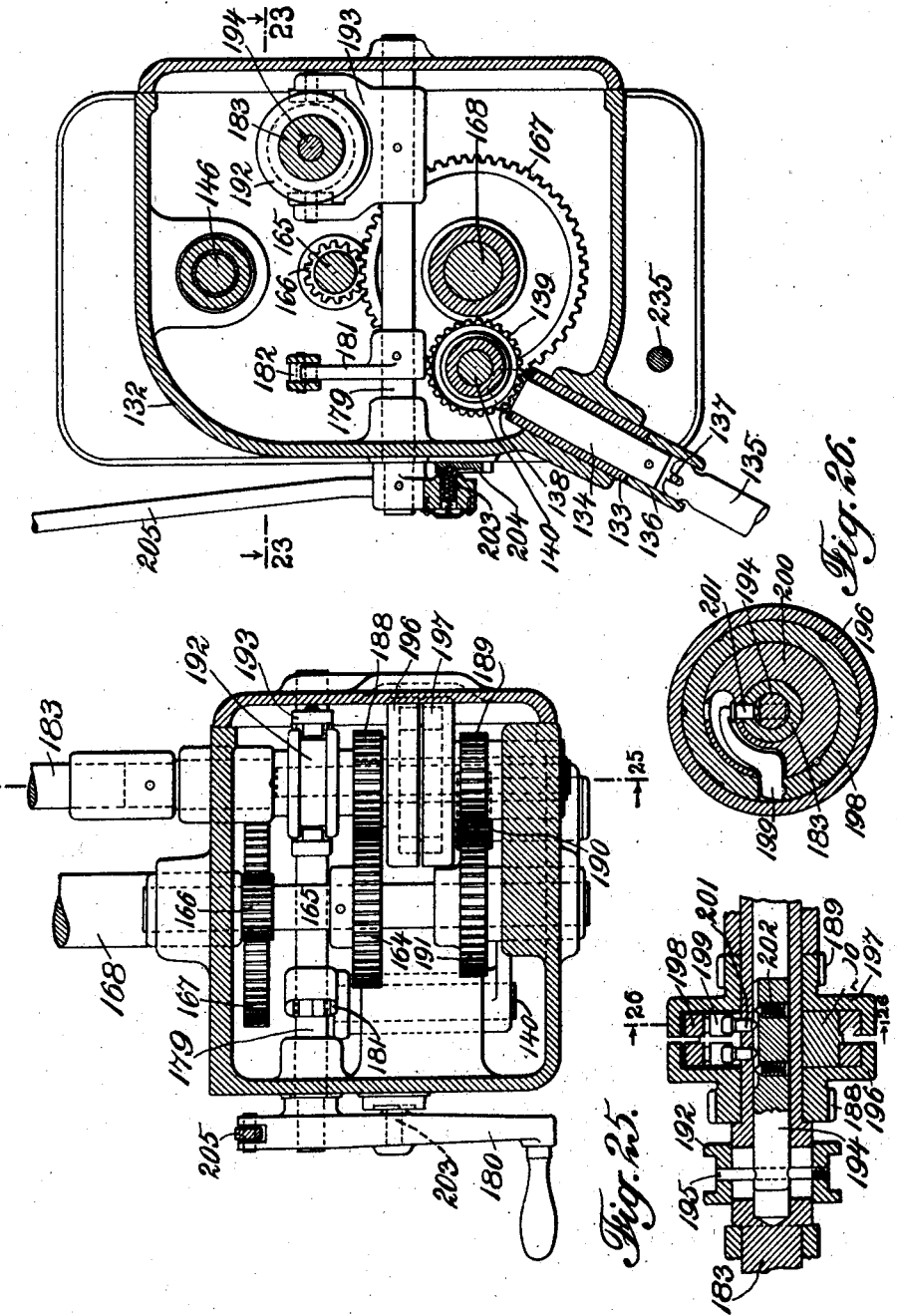

UNITED STATES PATENT OFFICE.

BENGT M. W. HANSON, OF HARTFORD, CONNECTICUT, ASSIGNOR TO PRATT & WHITNEY COMPANY, OF NEW YORK, N. Y., A CORPORATION OF NEW JERSEY.

VERTICAL-SURFACE-GRINDING MACHINE.

1,392,325.  Specification of Letters Patent.  Patented Oct. 4, 1921.

Application filed July 31, 1918. Serial No. 247,633.

*To all whom it may concern:*

Be it known that I, BENGT M. W. HANSON, a citizen of the United States, residing at Hartford, in the county of Hartford and State of Connecticut, have invented certain new and useful Improvements in Vertical-Surface-Grinding Machines, of which the following is a specification.

The invention relates especially to grinding machines of the type in which each is provided with a grinding wheel or ring which is rotatable about a vertical axis and which acts upon work secured to a table or support which is horizontally movable. In the present case the work table is rotatable.

One of the objects of the present invention is to provide an improved driving mechanism for the wheel, this consisting of an electric motor mounted in axial alinement with the wheel supporting spindle and having a sliding connection with the spindle which permits the wheel and spindle to be moved vertically independently of the motor. Another object of the invention is to provide improved means for rotating the table and for controlling the movement thereof. Another object of the invention is to provide improved means for moving the grinding wheel vertically, particularly for feeding it during the grinding operation. Another object of the invention is to provide improved guards for protecting the vertical ways along which the wheel supporting head is movable.

Further objects of the invention will be apparent from the following specification and claims.

In the accompanying drawings I have shown the embodiment of the invention which I now deem preferable, but it will be understood that as concerns many of the features there can be modification and substitution of equivalents without departing from the spirit of the invention as set forth in the claims appended to this specification.

Of the drawings:

Fig. 2 is a front view partly in section.

Fig. 3 is a fragmentary front view partly in section showing parts of the guards.

Fig. 4 is a plan view.

Fig. 5 is a longitudinal vertical sectional view taken through the center of the machine, the grinding wheel and the driving mechanism therefor being shown in elevation.

Fig. 6 is a fragmentary horizontal sectional view taken along the line 6—6 of Fig. 5.

Fig. 7 is a detail view showing a part of the mechanism for moving the wheel head.

Fig. 8 is a vertical sectional view through the grinding wheel and the supporting mechanism therefor, the view being taken along the line 8—8 of Fig. 5.

Fig. 9 is a fragmentary horizontal sectional view taken along the line 9—9 of Fig. 8.

Fig. 10 is a vertical longitudinal sectional view showing the left-hand part of the driving mechanism for the table. The view is taken along the line 10—11 of Fig. 12.

Fig. 11 is a vertical longitudinal sectional view showing the right-hand part of the driving mechanism for the table. The view is taken along the line 10—11 of Fig. 12.

Fig. 12 is a plan view showing the driving mechanism for the table, this view being partly in section along the lines 12—12 of Figs. 10 and 11.

Fig. 13 is a fragmentary vertical longitudinal sectional view on an enlarged scale taken along the line 13—13 of Fig. 12.

Fig. 14 is a vertical sectional view taken along the line 14—14 of Fig. 12.

Fig. 15 is a fragmentary side view taken from the left showing the drive wheel and the housing for the mechanism which drives the table.

Fig. 16 is a vertical sectional view taken along the line 16—16 of Fig. 11.

Fig. 17 is a fragmentary side view taken from the right and showing the controlling devices for the mechanism which drives the table and also showing a part of the driving gearing for the wheel feed mechanism.

Fig. 20 is a vertical sectional view taken along the lines 20—20 of Figs. 19 and 22.

Fig. 21 is a fragmentary vertical sectional view taken along the line 21—21 of Fig. 19.

Fig. 22 is a vertical sectional view taken along the lines 22—22 of Figs. 18 and 20.

Fig. 23 is a horizontal sectional view taken along the lines 23—23 of Figs. 19, 22 and 24.

Fig. 24 is a vertical sectional view taken along the lines 24—24 of Figs. 18 and 20.

Fig. 25 is a fragmentary longitudinal sectional view taken along the line 25—25 of Fig. 23.

Fig. 26 is a fragmentary sectional view taken along the line 26—26 of Fig. 25.

Fig. 27 is a vertical sectional view taken along the line 27—27 of Fig. 4 and showing the water pump.

Figure 1:
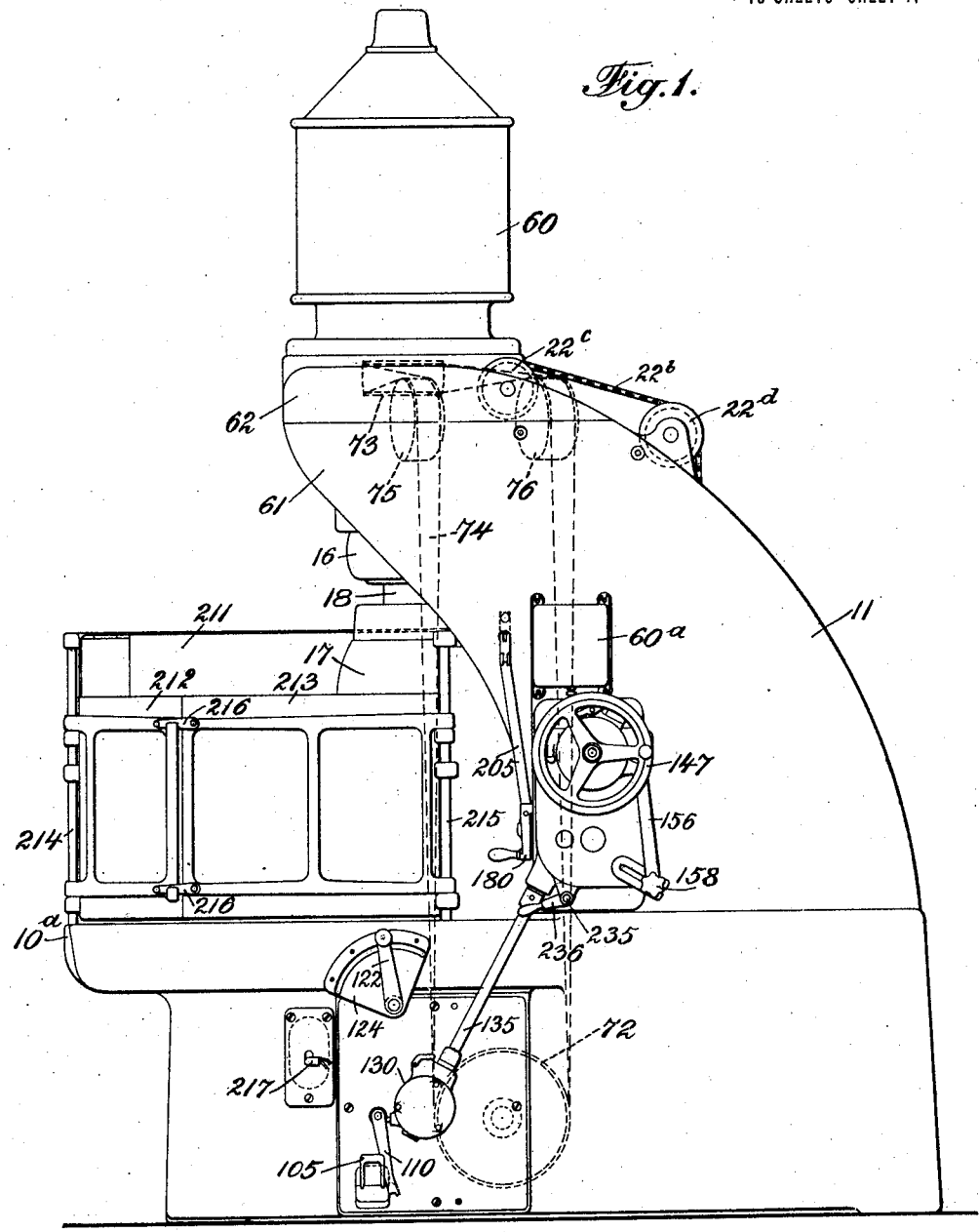
Figure 1 is a side view.
Figure 19:
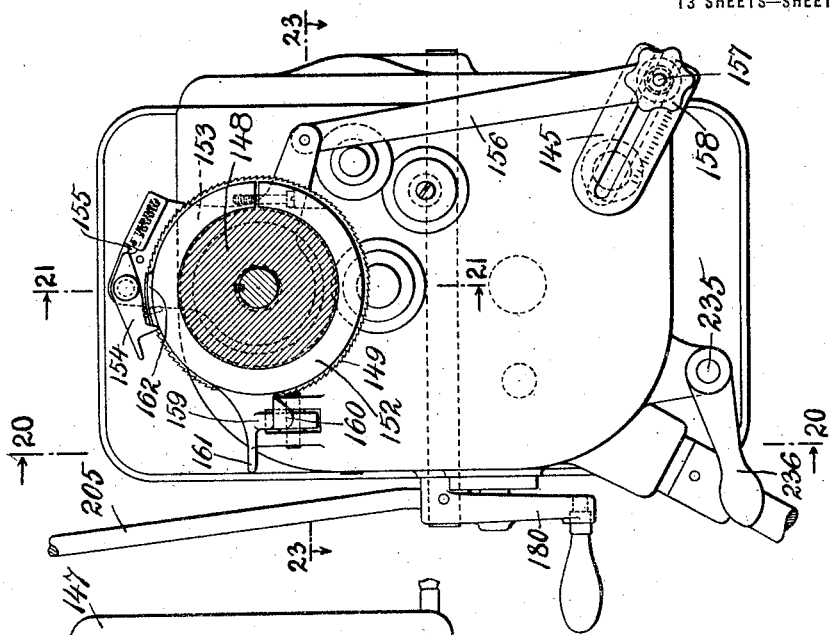
Fig. 19 is a side view taken from the right of the parts shown in Fig. 18. This view is partly in section along the line 19—19 of Fig. 20.

A machine embodying my invention comprises a horizontal rotatable table 1 adapted to support and hold the work to be ground, and a horizontal grinding wheel 2 which is rotatable about a vertical axis and which is adapted to engage and grind work supported on the table 1.

The rotatable table 1 is mounted on a base frame or housing 3 which is provided with a vertical bearing 4. The table 1 has a depending central trunnion 5 which fits the bearing 4 and is rotatable therein. Secured to the bottom of the table 1 is a ring 6 which has a bearing upon an annular surface 7 of the base frame 3, thus serving to support the table. Preferably the ring 6 is formed with gear teeth 8 by means of which the table may be rotated in the manner to be presently described.

Preferably, in order that the bearing at 7 and the other parts underneath the table may be protected from water and dirt, the table is provided near its edge with an annular groove 9 extending upward from the bottom. Into this groove there projects a flange 10 preferably formed integrally with the base frame. Surrounding the table is a flange 10ª preferably constructed integrally with the base 3 and forming a trough or gutter for receiving and carrying away water from the grinding wheel.

Secured to the base frame 3 at the rear of the table is an upward extending housing 11. This housing is provided with vertical guideways 12 in which is fitted a slide 13 formed on the wheel head 14. The slide 13 is held in place by vertical plates 15. The wheel head 14 is provided with two bearing brackets 16 and 17 in which the rotatable wheel spindle 18 is mounted. The aforesaid wheel 2 is connected to the lower end of the spindle.

The wheel head 14 is provided with a lug 19 which projects toward the rear. This lug has a vertical aperture in which is fitted a threaded sleeve 20. Extending through the sleeve and engaging the threads thereof is a vertical screw 21 rotatably mounted in bearings 22, 22 in the housing 11. By means of the screw the head can be moved vertically and can be held in any desired position of adjustment, as will be more clearly set forth hereinafter. For assisting in carrying the weight of the head 14 and of the parts connected thereto, I provide a counterweight 22ª which is connected to the head by means of a chain 22ᵇ passing over pulleys 22ᶜ and 22ᵈ.

Interposed between the upper bearing bracket 16 and the spindle is a ball bearing 23, as shown in Fig. 8. This bearing 23 serves simply as a journal bearing and has no function in determining the relative vertical position of the spindle. The outer race of the bearing can adjust itself vertically in accordance with the spindle position. Preferably there are provided at 24 devices for holding and preventing the escape of oil which may be supplied from an oil cup 25.

Interposed between the lower part of the spindle 18 and the bearing bracket 17 is a ball bearing 26. Also interposed between the spindle and the bearing bracket 17 and positioned above the bearing 26 is a second ball bearing 27. The two ball bearings 26 and 27 coöperate to hold the spindle against vertical movement with respect to the wheel head in either direction. In order that there may be no lost vertical motion in these bearings, the inner race of the upper bearing is vertically slidable on the spindle and is pressed downward with respect to the spindle by means of two spring plungers 28, 28 which engage a ring 29, the ring in turn engaging the inner race of the bearing. These spring plungers are mounted in a ring 30 which abuts against a collar 31 threaded into the shaft and locked by means of the clamping screw 32. The two rings 29 and 30 are held against rotation with respect to the spindle by means of a key 33. It will be seen that the spring plungers tend to press the inner race of the bearing 27 relatively downward, or in other words, the plungers tend to lift the spindle and the wheel; this tendency being counteracted by the lower ball bearings 26. In this way the spindle and the wheel are always maintained in their uppermost relative positions and no vertical play in the bearings is permitted.

Lubricant for the bearing 27 can be supplied from an oil cup 33ª. Preferably a shedder 34 is held between the ring 30 and the collar 31, this shedder coöperating with the annular flanges 35 and 36 supported on the bearing bracket 17 to prevent oil or dirt from entering the ball bearings. Preferably, in order to prevent oil from the upper bearing 27 from reaching the lower bearing 26, there is provided a shedder 37 which coöperates with a bushing 38 carried by the bearing bracket 17.

The grinding wheel 2 is preferably in the form of a ring, as shown, and this is connected to the spindle 18 by means of a circular plate or disk 39. The disk 39 has an annular water channel 40 which is closed at its top by means of an annular casting 41 secured to the bearing bracket 17. At one side the casting 41 is formed with a duct 42 to which is connected a water pipe 43. Water from the pipe passes through the duct 42 into the channel 40 where it is distributed circumferentially. From the channel 40 the water passes to the wheel through apertures 44, 44 arranged at intervals about the circumference. Preferably, in order to prevent any water from reaching the ball bearing 26, the plate 39 is provided with an upward projecting annular flange 45 which is in close proximity to the annular surface 46 of the casting 41. In order to make a liquid seal between the two adjacent surfaces, the surface of the flange 45 is annularly grooved as indicated at 47.

Preferably the wheel 2 is provided with a metal band 48 which serves to reinforce it and carry part of the centrifugal stress arising from the rapid rotation. In order to provide against damage in case of breakage of the wheel and in order further to prevent the free escape of water in all directions, I provide an annular guard 49 which depends from the casting 41. Preferably the guard is made of sheet metal and formed in sections 50 and 51 the lower of which is vertically adjustable. The guard preferably also has a third section 52 at the bottom which is formed of flexible material such as leather. As shown most clearly in Fig. 6, I provide a sheet metal guard back of the wheel to protect the vertical way 12 from moisture and dirt. The guard is carried by the wheel head and in order that it may adjust itself in accordance with vertical movements of the head it is made in two sections 53 and 54. As shown, the two sections are connected to the slide 13 and as shown in Fig. 3 there is a slotted connection 55 which permits relative adjustment of the guard sections as required. Preferably sheet metal strips 55ª extend upward over the plates 15.

In order to protect the ways 12 at points above the head, I provide a canvas guard 56 which is secured at one end to the upper part of the head and which extends upward, backward and downward over rollers 57 and 58. At the other end of the canvas is a counterweight 59. It will be seen that this construction is such that the canvas automatically adjusts itself to different positions of the head. It has heretofore been proposed to provide a canvas guard which is wound upon and unwound from a roll, but this construction is objectionable for the reason that in rolling dirt is transferred from one side of the canvas to the other and in this way finally reaches the bearing surface. With my improved construction the back side or inside of the canvas is kept clean at all times.

Supported at the top of the housing 11 is a driving motor for the spindle 18. I prefer and have shown an electric motor 60 arranged with its drive shaft vertical and in alinement with the spindle, but it will be understood that so far as some of the features of the invention are concerned, some other form of driving motor might be substituted. When an electric motor is used the controller therefor can conveniently be mounted on the frame 11 as shown at 60ª. As illustrated, the housing 11 is extended toward the front at both sides in the form of wings 61, 61. Resting upon and bridging these two wings is a cap plate 62 to which the frame of the motor is secured.

The drive shaft 63 of the motor projects downward and enters the spindle 18 which is made hollow to receive it. Surrounding the shaft 63 is a coupling 64 for connecting the shaft with the spindle 18. The driving element 65 of the coupling is splined to the shaft 63 to permit the coupling to be moved vertically with the wheel head and with the spindle without moving the shaft 63 and without interfering with the power connection. As shown in Fig. 8, the shaft 63 is provided with two keyways into which are fitted keys 66 carried by the driving element 65 of the coupling. The driven element 67 of the coupling is rigidly secured to the upper end of the spindle 18 and preferably the driving and driven elements are flexibly connected in order to compensate for minor inaccuracies of alinement and in order to provide a resilient connection between the motor and the wheel. Preferably I provide a flexible connection of the pin and belt type such as is shown in Fig. 9. This connection comprises a series of pins 68 projecting downward from the driving element 65 and a series of pins 69 projecting upward from the driven element 67. Interlaced back and forth around these pins is an endless belt 70 preferably formed of leather.

It will be seen that the construction which I have provided enables the weight of the motor to be carried directly by the main frame castings without interfering in any way with the free vertical movements of the wheel head and the wheel. The wheel head and the supporting and controlling parts therefor can be made much lighter than otherwise would be necessary, and can be rigidly held without any interference arising from the weight or from the vibration of the motor.

The driving mechanism for the table is located below the table and chiefly within the main frame or housing 3. The main shaft 71 of the driving mechanism projects at the left side of the machine and loosely mounted on this shaft is a belt pulley 72.

The drive shaft of the motor 60 is provided with a belt pulley 73 and a belt 74 passes over and around these two pulleys, being guided by idler pulleys 75 and 76 carried by brackets formed on or carried by the cap plate 62.

As shown in Fig. 10, the base frame 3 is provided at its left-hand side with a large aperture in which there is positioned a casing 77 for containing parts of the driving mechanism. This casing is bolted or otherwise connected to the frame 3, and lies partly inside the frame and partly outside. The aforesaid shaft 71 is fitted in bearings in the casing 77. The belt pulley 72 is secured to a sleeve 78 which is rotatable on the shaft 71. The sleeve 78 is adapted to be connected to the shaft 71 by means of a friction clutch 79 of the multiple disk or Weston type. For operating the clutch there is provided a sleeve 80 mounted on the sleeve 78 and provided with an annular groove 81. A forked lever 82 is pivotally mounted on the casing 77 and is provided with projections fitting the groove 81. A link 83 is connected to the lever 82 and by means of the link and the lever the sleeve 81 can be moved in one direction or the other to force the disks together or release them and thus connect the shaft 71 with the driving pulley or disconnect it therefrom.

Secured to the shaft 71 is a pinion 84 which meshes with a gear 85 rigidly secured to a shaft 86 parallel to the shaft 71 and also mounted in bearings in the casing 77. Also rigidly secured to the shaft 86 are other gears 87, 88 and 89 of progressively smaller diameters. These gears 85, 87, 88 and 89 are in mesh respectively with gears 90, 91, 92 and 93 which are loosely mounted on a shaft 94 which also is parallel to the shafts 71 and 86 and which also has bearings in the casing 77. The shaft 94 is hollow and longitudinally slidable within this shaft is a rod 95 carrying a pivoted key 96 which is normally pressed outward through a slot 96ª in the shaft 94, as shown in Fig. 13, by means of a spring 97. The hubs of the gears 90, 91, 92 and 93 are provided with keyways 98. By moving the rod 95 longitudinally the key 96 can be brought into a position opposite any one of the gears and will be moved into one of the keyways of that gear by means of the spring. Rings 99, 99 are interposed between the gears to separate them and to swing the key 96 inward while it is being moved from one gear to the next, thus preventing it from engaging two gears at the same time. It will be clear that the mechanism which I have described constitutes a change-speed gearing whereby the shaft 94 may receive power from the constant speed shaft 71 and be rotated at any one of four speeds, as desired.

Secured to the shaft 94 is a bevel gear 100 which meshes with a bevel gear 101 secured to a vertical shaft 102. This shaft 102 is mounted in a bearing sleeve 103 carried by the main frame 3. The shaft 102 carries at its upper end a pinion 104 which meshes with the annular gear 6 already referred to as connected to the table 1. In this way power is transmitted to rotate the table.

In order that the operator may conveniently start and stop the table 1, there is provided a foot treadle 105 at the right-hand side of the machine. The foot treadle is carried by a horizontal sleeve 106 which is rotatable on the main frame. This sleeve carries an arm 106ª which is connected with a vertical link 107. At its upper end the link is connected with a bell-crank lever 108. The bell-crank lever is pivoted to the main frame at 109 and the other arm of the lever is connected with the aforesaid link 83. It will be seen that the operator, by pressing downward on the foot treadle 105, can tension the link 83 and thus press together the elements of the clutch 79 and start the transmission of power to the table. By releasing the foot treadle the clutch elements are permitted to separate and thus interrupt the power transmission. In order that the foot treadle may be held down mechanically when desired, I provide a latch 110 pivoted to the main frame at 111 and adapted to be swung into position to engage the top of the treadle and hold it down. Preferably there is a spring-pressed plunger 112 for engaging the latch 110 to hold it either out of or in operative position, as desired.

The following mechanism is provided to enable the operator standing at the right-hand side of the machine to control the change-speed gearing to change the speed of rotation of the table. A sleeve 113 is slidably mounted on the shaft 94. The shaft is provided with two opposite slots 114 and a pin 115 extends through these slots and connects the sleeve 113 with the aforesaid rod 95. The sleeve is provided with a series of annular grooves so formed as to provide ridges 116 between them which are in the form of gear teeth. Meshing with the annular gear teeth 116 is a pinion 117 carried by a vertical shaft 118. This shaft is rotatable in bearings carried by the main frame and has secured to it at its upper end a bevel pinion 119. This bevel pinion 119 meshes with a bevel gear 120 on a horizontal shaft 121 mounted in suitable bearings in the main frame. This shaft 121 extends outward to the right of the machine where it is provided with a hand lever 122 having a spring-pressed locking plunger 123. Mounted adjacent the lever 122 is a segment plate 124 having four holes 125, 125. It will be seen that the operator, by moving the lever 122, can turn the shafts 121 and 118 and in this way move the sleeve 113 longitudinally. The sleeve 113 is connected, as already described, with the rod 95 and thus with the key 96. Longitudinal movement of the key serves to engage it with one or another of the gears 90, 91, 92 and 93 as already described. The holes 125, 125 in the segment 124 are spaced in accordance with the several operative positions of the key 96. The spring-pressed plunger 193 can be entered in one or another of the holes 125 and thus serves to lock the key 96 in one or another of its operative positions. It will be clear that by means of this mechanism the operator can change the table speed as desired. It will be understood that ordinarily it is better to release the clutch 79 before adjusting the change-speed gearing.

The shaft 94 is extended toward the right and fits a bearing 126 in the main frame 3. At its right-hand end the shaft carries a bevel gear 127 which meshes with a bevel gear 128 connected to a short inclined shaft 129. The shaft 129 has a bearing in a housing 130 formed at the side of the machine, this housing with its cover 131 inclosing the two gears 127 and 128.

The gearing and other devices for controlling the wheel feed are mounted in a casing 132 secured to the right-hand side of the frame housing 11. Rotatably mounted in a bearing bushing 133 which extends through a wall of the casing, is a short shaft 134 approximately in alinement with the aforesaid shaft 129. The two shafts 129 and 134 are connected by means of a shaft 135 which is flexibly engaged with the said shafts at its ends. As shown, each of the shafts 129 and 134 carries a sleeve 136 across which extends a pin 137. Each end of the shaft 135 is slotted to receive the corresponding pin 137. Being thus connected, the shaft 135 serves to transmit power from the shaft 129 to the shaft 134, but the connection is sufficiently flexible to permit the shafts 129 and 134 to be slightly out of alinement.

The shaft 134 carries at its upper end a bevel pinion 138 which meshes with a bevel gear 139 at the inner end of a transverse horizontal shaft 140. At the outer end of the shaft 140 is a crank 141 which is connected by a link 142 with a crank 143 on a rock shaft 144. The rock shaft 144 is mounted in a bearing in the casing and extends outward through the wall of the casing. Mounted upon the outer end of the shaft 144 is a crank arm 145 having a longitudinal slot therein. The connections are such that there is approximately one complete oscillation of the crank arm for each revolution of the table.

Rotatably mounted in the upper part of the casing 132 is a transverse horizontal shaft 146 which carries at its outer end a hand wheel 147. Mounted on the shaft adjacent the hand wheel is a hub 148 which has secured to it a ring 149 provided with ratchet teeth and a ring 150 provided with graduations 151 as shown in Figs. 20 and 21. Positioned between these two rings 149 and 150 is a third ring 152 which frictionally engages the hub 148 and is rotatable thereon. Loosely mounted on the shaft 146 is a rocker arm 153 carrying a pawl 154 which is adapted to engage the ratchet teeth on the ring 149. By means of a spring-pressed plunger 155 the pawl 154 may be held either in or out of engagement with the ratchet teeth. The rocker arm 153 is connected by means of a link 156 with the aforesaid crank arm 145. The connection between the link and the crank arm is an adjustable one, there being provided a pivot pin 157 which is movable longitudinally of the crank arm in the slot therein. The pivot pin can be clamped in adjusted position by means of the knob 158.

From the foregoing description it will be clear that the rotative movement of the shaft 134 serves to oscillate the shaft 144 which in turn serves, by means of the connections described, to oscillate the arm 153 to a greater or less extent, as desired. The pawl 154 on the arm 153, by its engagement with the ratchet teeth, serves to intermittently turn the shaft 146.

The ring 152 is split as shown in Fig. 20 and is frictionally connected with the hub 148 and thus with the shaft 146. This ring has a projection 159 which is adapted to engage a pivoted finger 160 projecting outward from the casing 132. The projection 159 has a handle 161. The finger 160 also serves as a pointer to coöperate with the scale 151 on the ring 150. Connected to the ring 150 is a small arcuate plate 162 which projects over the ratchet ring 149 and covers some of the teeth thereof. This plate serves at certain times, as will be hereinafter explained, to hold the pawl out of engagement with the ratchet teeth.

Mounted on the shaft 146 is a pinion 163 which meshes with a gear wheel 164 on the horizontal shaft 165 parallel to the shaft 146 and mounted in bearings in the casing 132. The shaft 165 carries a pinion 166 which meshes with a gear 167 on a shaft 168. The shaft 168 is mounted at one end in a bearing 169 carried by the casing 132. From the bearing the shaft extends toward the left where it is supported in a bearing 170 in the main housing 11. At the left hand end of the shaft is a bevel pinion 171 which meshes with a bevel gear 172 at the lower end of the feed screw 21. The feed screw is held against vertical movement by means of thrust bearings 173 and 174, and the result is that when the screw is turned by means of the shaft 168 and the gearing the head 14 with the wheel 2 is raised or lowered.

The aforesaid pinion 163 is preferably loosely mounted on the shaft 146 and is connectible therewith by means of a toothed clutch 175. The relatively movable element of this clutch is an annularly grooved collar 176 which is splined on the shaft and which is longitudinally movable under the control of a bell-crank lever 177. This lever is pivoted to the casing 132 at 178. Extending across the casing 132 at right angles to the shaft 146 is a horizontal rock shaft 179 which carries at its front end a hand lever 180. Projecting upward from the rock shaft 179 is an arm 181 having at its upper end a notch adapted to receive a roller 182 on the bell-crank lever 177. When the arm 180 is upright, as shown, the roller is entered in the notch and the elements of the clutch 175 are engaged. When the rock shaft 179 is moved to swing the arm 180 in either direction, the roller 182 is forced upward, thus separating the elements of the clutch.

Mounted in the casing 132 parallel to the shafts 146 and 165 is a shaft 183. This shaft extends entirely across the housing 11 and is supported at the opposite side in a bearing 184. At the left-hand end of the shaft there is a belt wheel 185 which is in alinement with a belt wheel 186 preferably formed integrally with the belt wheel 72 on the shaft 71. A belt 187 passes over these two pulleys and thus serves to constantly drive the shaft 183. Loosely mounted on the shaft 183 are two gear wheels 188 and 189. The gear wheel 188 meshes with the aforesaid gear wheel 164 on the shaft 168 and the gear wheel 189 meshes with an idler pinion 190 which in turn meshes with a gear 191 on the shaft 165. Clutches are provided whereby either of the gears 188 or 189 may be operatively connected with the shaft 183. Slidable on the shaft 183 is a clutch collar 192 which is adapted to be moved in either direction by means of a forked lever 193 carried by the aforesaid rock shaft 179. The shaft 183 is hollow, as shown in Fig. 25, and slidable in the central aperture thereof is a rod 194. A pin 195 extends through the slots in the shaft 183 and connects the rod 194 with the collar 192. The gears 188 and 189 have connected to them respectively disks 196 and 197 which are provided with annular flanges which extend toward each other. As shown in Fig. 26, there is positioned within each annular flange an expansible ring 198 adapted to be expanded into frictional engagement with the flange by means of a rocker lever 199 positioned within a collar 200 carried by the shaft. For moving the lever there is a plunger 201 which projects inward through an aperture in the shaft. This plunger 201 has a frusto-conical point which is adapted to be engaged by the frusto-conical point of a screw 202 carried by the aforesaid slidable rod 194. When the rod 194 is in its central position, as shown in Fig. 25, the two screws 202 are out of engagement with the plungers 201 and both of the clutches are disengaged. By moving the rod 194 in one direction or the other either clutch may be engaged, as desired. As already stated, the rock lever 193 which serves to move the rod 194 is carried by the same rocker shaft 191 which carries the lever 180. Therefore, when the shaft is in its central position, the two gears 188 and 189 are loose on the shaft 183 and the clutch 175 is engaged. When the rocker shaft is moved to connect either of the gears 188 or 189 with the shaft 183, the clutch 175 is simultaneously opened. Preferably, in order that the hand lever 180 may be held in any one of its three operative positions, it is provided with a spring-pressed plunger 203 which is adapted to enter any one of three holes formed in a plate 204.

The gears 188 and 189 are used for moving the wheel head rapidly upward or downward, whereas the ratchet and pawl mechanism is used for the normal slow feeding movement. It will be clear that by means of the lever 180 the operator can control the movement of the head, being able to cause it to move rapidly upward or rapidly downward or to be moved slowly downward for feeding. When the gear 188 is connected, power is transmitted to move the head downward and when the gear 189 is connected, power is transmitted to move the head upward.

Preferably, in order to prevent the operator from inadvertently attempting to raise or lower the head too far, I provide an automatic safety device. As shown, the hand lever 180 is extended toward the left and has connected with it a link 205 which extends upward and which is connected at its upper end to a bell-crank lever 206 pivoted on the housing 11. From the other arm of the bell-crank lever there extends toward the left a horizontal link 207. This link at its left-hand end is connected with a bell-crank lever 208 also pivoted on the housing 11. The other arm of this bell-crank lever 208 is positioned in the path of stops 209 and 210 carried by the slide 13. Preferably the upper stop 210 is adjustable vertically in a T-slot extending along the edge of the slide. It will be seen that if the head 14 is permitted to move downward the upper stop 210 will engage the bell-crank lever 208 and will swing the hand lever 180 in the counter-clockwise direction and thus disengage the gear wheel 188 from the shaft 183. If the wheel head be moved upward the stop 209 will engage the bell-crank lever 208 and will swing the hand lever 180 in the clockwise direction, thus disengaging the gear 189 from the shaft 183.

Preferably, in order to prevent the escape of water and to protect the operator, there is provided a guard which extends around the table 1 and the wheel 2. One side of the guard is permanently mounted in position as shown at 211 in Figs. 1, 2, 4 and 5. At the other side of the guard, preferably at the right-hand side, there are swinging doors 212 and 213 which permit the operator to have access to the table for the purpose of removing finished work and putting on new work. These doors 212 and 213 are pivoted respectively at 214 and 215 and are provided with latches 216, 216 by means of which they may be held in closed positions.

I have already referred to the table 1 as being adapted to support and carry the parts to be ground. I do not limit myself to any one form of table, but I prefer to use a table in the form of a magnetic chuck. The electrical details of the chuck constitute no part of my invention and are not herein shown. It will be observed, however, that current is supplied to the chuck through a cable 217 shown in Fig. 2. The cable carries two conductors which are connected respectively to the brushes 218 and 219. These brushes engage respectively with conductor rings 220 and 221 carried by the table or chuck at its lower side.

Preferably the chuck, in addition to being provided with coils for magnetically holding the work, is also provided with radial T-slots 222 which may be used either for mechanically holding the work or for mechanically holding guides or stops which serve to position the work. This combined mechanical and electrical shuck is not herein claimed as part of this invention but is set forth and claimed in my copending application for chucks, Serial No. 247,635, filed on even date herewith.

As already stated, water is supplied to the grinding wheel through the pipe 43. This water may be supplied from any desired source, but I preferably provide a water circulating system which is a permanent part of the machine. As shown in Fig. 4, there is provided a tank 223 at the left-hand side of the machine connected to the base frame 3. The trough or gutter formed by the flange 10$^a$ is at the left extended toward the rear and water is discharged from the trough into the tank through an aperture 224. Preferably suitable strainers or filters 224$^a$ are provided in the upper part of the tank to remove from the water any foreign matter such as abraded material from the wheel or from the metal being ground. A pump is provided at the rear end of the tank, which is preferably of the centrifugal type, being located at the bottom of the tank and rotatable about a vertical axis. In Fig. 27 the pump casing is indicated by 225 and the rotor by 226. The rotor is secured to the end of a vertical shaft 227 which at its upper end is connected with a horizontal shaft 228 by means of bevel gearing 229. The shaft 228 carries a belt pulley 230 which is in alinement with the aforesaid belt pulleys 185 and 186. Preferably the same belt 187 which passes over the pulleys 185 and 186 is extended to also pass over the pulley 230, as indicated by dotted lines in Fig. 5. For guiding the belt 187 there is provided a supplemental idler pulley 231 carried by a bracket projecting from the housing 11. Extending upward from the pump is a pipe 232 which is connected with a pipe 233 extending forward as shown by dotted lines in Fig. 5. The pipe 233 is provided at 234 with a valve. This valve is connected with a shaft 235 which extends entirely across the machine and has connected to it at its right-hand end a lever 236. Beyond the valve 234 there is connected a flexible pipe 237 which extends to and is connected with the aforesaid supply pipe 43.

From the foregoing description it will be seen that the pump is continuously operated and continuously maintains a pressure in the pipes 232 and 233. By means of the lever 236 the operator can open or close the valve 234 and thus supply water to the wheel or shut it off, as desired.

In operation, assuming that a large number of pieces of the same character are to be ground, the stop 210 is so adjusted that it will prevent the wheel from being moved downward into engagement with the work by means of the high speed connection through the shaft 183. The pieces to be ground are loaded onto the table which is preferably rotated during loading to make the operation more convenient for the operator. During loading the operator can manually control the speed of table rotation by means of the foot treadle 105. He can hold the treadle down and permit the table to rotate at full speed, or, if he finds that he can not load fast enough to keep up with this full speed, he can release the treadle and permit the table to stop. If preferred, the operator can, by properly regulating the pressure on the treadle, run the table at an intermediate speed which is adapted to the speed of loading. It will be noted that this control of the speed by means of the treadle 105 is entirely supplemental to the normal speed adjustment which is effected by means of the hand lever 122. By means of this hand lever the change-speed gearing can be so connected as to give any one of the four speeds which may be deemed preferable in accordance with the character of the work, the amount of metal to be removed, the nature of the material, etc.

After the table is loaded and the foot treadle is locked in its lowermost position by means of the latch 110, the operator may then bring the grinding wheel approximately into grinding position by means of the rapid traverse connection which is controlled by the lever 180. The aforesaid stop 210 prevents the operator from accidentally moving the wheel too far downward.

The machine is now ready for grinding and the operator can start the flow of water to the interior of the wheel by turning the lever 236 to open the valve. Then the operator, by means of the hand wheel 147, can lower the wheel into engagement with the work, it being understood that the pawl 154 is first thrown out of engagement with the ratchet wheel 149. The operator gages the work from time to time to ascertain when it is ground to the required thickness. It will be observed that as the wheel is turned the ring 152 is carried with it until the projection 159 engages the stop 160. Continued movement of the hand wheel causes the ring to slip on the hub 148, the projection remaining in engagement with the stop. After the work is ground to size the operator raises the wheel by turning the hand wheel in the reverse direction. Usually a fraction of a turn of the hand wheel is sufficient, and in this case the projection 159 does not engage the stop 160 on the backward movement. But if the stop is engaged it is simply swung upward on its pivot without disturbing the setting of the ring 152.

The finished work is removed from the table and a new lot of unground pieces is put in place, as already described. The operator then again engages the grinding wheel with the work by turning the hand wheel, as before. When the projection 159 engages the stop 160 the operator knows that the work is ground approximately to size, though there may be a slight variation because of wear of the grinding wheel. The operator can feed the wheel downward such supplemental distance as may be required, and this distance can be accurately determined by means of the graduations on the ring 151 in coöperation with the stop 160 which also acts as a pointer.

Figure 18:
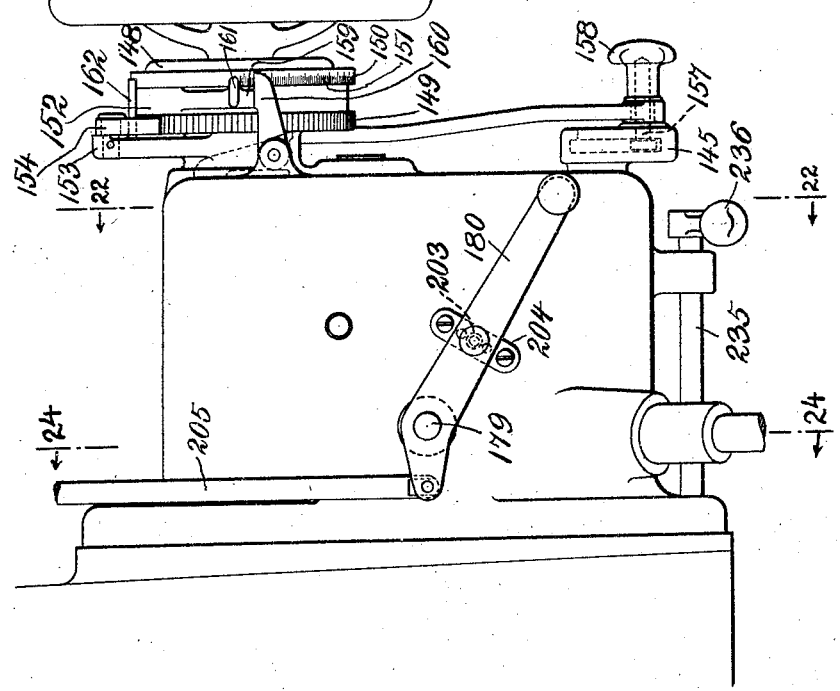
Fig. 18 is a front view showing the housing and part of the controlling devices for the wheel feed mechanism.

In the operation thus far described the feed is effected entirely by hand. The machine is equally well adapted for power feeding, this being effected by means of the ratchet 154, the ratchet wheel 149 and the several other parts which have already been fully described. For power feeding, the stop 160 is thrown to its inoperative position, as shown in Fig. 18. The ring 152 is so adjusted on the hub 148 that the plate 162 is carried underneath the pawl to throw it out of operation when the work is ground to the approximately proper thickness. This construction permits the wheel to operate without the undivided attention of the operator, and the automatic throw-out for the pawl prevents the feeding from being continued so as to injure the work. If after the power feeding has stopped it is found that supplemental feeding is necessary because of the wear of the wheel, this can be effected manually by means of the hand wheel 147.

What I claim is:

1. In a grinding machine, the combination of a horizontally movable work supporting table, a wheel head positioned above the table and capable of vertical movement, a grinding wheel and a spindle therefor rotatably mounted in the head, driving means for said wheel comprising a motor mounted in alinement with the axis of said wheel, a shaft connected to said motor having a slidable connection with said wheel spindle whereby the head with the spindle and wheel may be moved vertically independently of the motor and its shaft while the wheel engages the work and without disturbing the power connection, and means in said head for resiliently thrusting said wheel and spindle upward independently of said motor and motor shaft.

2. In a grinding machine, the combination of a horizontally movable work supporting table, a wheel head positioned above the table and capable of vertical movement, a grinding wheel and a spindle therefor rotatably mounted in the head, an electric driving motor mounted in fixed position with the axis of its rotor in alinement with the axis of the spindle, and a slidable connection between the motor and the spindle whereby the head with the spindle and the wheel may be moved vertically independently of the motor without disturbing the power connection.

3. In a grinding machine, the combination of a horizontally movable work supporting table, a wheel head positioned above the table and capable of vertical movement, a grinding wheel and a spindle therefor rotatably mounted in the head, and an electric driving motor mounted in fixed position with its driving shaft in telescopic splined engagement with the spindle, whereby the head with the spindle and the wheel may be moved vertically independently of the motor without disturbing the power connection.

4. In a grinding machine, the combination of a horizontally movable work supporting table, a wheel head positioned above the table and capable of vertical movement, a grinding wheel and a spindle therefor rotatably mounted in the head, an electric driving motor mounted in fixed position with the axis of its rotor in alinement with the axis of the spindle, and a power connection between the motor and the spindle which is both flexible and relatively slidable.

5. In a grinding machine, the combination of a horizontally movable work supporting table, a wheel head positioned above the table and capable of vertical movement, a grinding wheel and a hollow spindle therefor rotatably mounted in the head, an electric driving motor mounted in fixed position with its driving shaft extending into the hollow spindle, two adjacent rotatable elements carried by the wheel head one rigidly connected to the spindle and the other splined to the motor shaft, and a flexible driving connection between the said elements.

6. In a grinding machine, the combination of a horizontal rotatable work supporting table, a wheel head positioned above the table and capable of vertical movement, a grinding wheel and a spindle therefor rotatably mounted in the head, an electric driving motor mounted in fixed position with the axis of its rotor in alinement with the axis of the spindle, a slidable connection between the motor and the spindle whereby the head with the spindle and the wheel may be moved vertically independently of the motor without disturbing the power connection, and a driving connection from the motor to the table.

7. In a grinding machine, the combination of a horizontal rotatable work supporting table, a wheel head positioned above the table and capable of vertical movement, a grinding wheel and a spindle therefor rotatably mounted in the head, an electric driving motor mounted in fixed position with the axis of its rotor in alinement with the axis of the spindle, a slidable connection between the motor and the spindle whereby the head with the spindle and the wheel may be moved vertically independently of the motor without disturbing the power connection, and a driving connection independent of the spindle from the motor to the table.

8. In a grinding machine, the combination of a horizontal rotatable work supporting table, a wheel head positioned above the table and capable of vertical movement, a grinding wheel and a spindle therefor rotatably mounted in the head, an electric driving motor mounted in fixed position with its driving shaft in alinement with the axis of the spindle, a slidable connection between the driving shaft and the spindle whereby the head with the spindle and the wheel may be moved vertically independently of the motor without disturbing the power connection, and a driving connection from the motor to the table including a belt wheel on the motor driving shaft and a belt engaging the said belt wheel.

9. In a grinding machine, the combination of a horizontal rotatable work supporting table, a wheel head positioned above the table and capable of vertical movement, a grinding wheel and a spindle therefor rotatably mounted in the head, a feed mechanism for the wheel, table turning mechanism located beneath the table and including change-speed gearing, means at one side of the machine for driving the table turning mechanism, and a power connection between the table turning mechanism and the feed mechanism, the said connection being independent of the table and located at the side of the table opposite the driving means.

10. In a grinding machine, the combination of a horizontal rotatable work supporting table, a wheel head positioned above the table and capable of vertical movement, a grinding wheel and a spindle therefor rotatably mounted in the head, a driving motor having its driving shaft in alinement with and connected to the spindle, mechanism for turning the table, a driving connection from the motor to the table turning mechanism, a feed mechanism for the wheel, and a driving connection independent of the table between the table turning mechanism and the feed mechanism.

11. In a grinding machine, the combination of a horizontal rotatable work supporting table, a wheel head positioned above the table and capable of vertical movement, a grinding wheel and a spindle therefor rotatably mounted in the head, a feed mechanism for the wheel, a driving motor having its driving shaft in alinement with and connected to the spindle, table turning mechanism located beneath the table and including change-speed gearing, means at one side of the machine for driving the table turning mechanism from the motor, and a power connection between the table turning mechanism and the feed mechanism, the said connection being independent of the table and located at the side of the table opposite the driving means.

12. In a grinding machine, the combination of a horizontal rotatable work supporting table, a wheel head positioned above the table and capable of vertical movement, a grinding wheel and a spindle therefor rotatably mounted in the head, a feed mechanism for the wheel including gearing at one side of the machine, a shaft associated with the feed gearing and extended across the machine, table turning mechanism located beneath the table, means at the side of the machine opposite the feed gearing for driving the table turning mechanism and the said shaft, a power connection between the table turning mechanism and the feed mechanism, the said connection being independent of the table and located at the side of the table opposite the driving means, and means for optionally connecting the feed gearing with the said power connection for slow feeding or with the said shaft for rapid movement.

13. In a grinding machine, the combination of a horizontal rotatable work supporting table, a wheel head positioned above the table and capable of vertical movement, a grinding wheel and a spindle therefor rotatably mounted in the head, a driving motor having its driving shaft in alinement with and connected to the spindle, a feed mechanism for the wheel including gearing at one side of the machine, a shaft associated with the feed gearing and extended across the machine, table turning mechanism located beneath the table, means at the side of the machine opposite the feed gearing for driving the table turning mechanism and the said shaft from the motor, a power connection between the table turning mechanism and the feed mechanism, the said connection being independent of the table and located at the side of the table opposite the driving means, and means for optionally connecting the feed gearing with the said power connection for slow feeding or with the said shaft for rapid movement.

14. In a grinding machine, the combination of a horizontally movable work supporting table, a grinding wheel positioned above the table and capable of vertical movement, and a feed mechanism for the wheel comprising a manually operable shaft, a ratchet wheel secured to the shaft, a ring frictionally connected with the shaft, a power operated oscillating pawl for engaging the ratchet wheel, a plate carried by the ring and adapted to engage the pawl as the ring turns and thus stop the power feed, a projection carried by the ring and a stop for engaging the projection to limit the movement of the ring during hand feeding.

15. In a grinding machine, the combination of a horizontally movable work supporting table, a grinding wheel positioned above the table and capable of vertical movement, and a feed mechanism for the wheel comprising a manually operable shaft, a ratchet wheel secured to the shaft, a graduated disk secured to the shaft, a ring frictionally connected with the shaft between the ratchet wheel and the disk, a power operated oscillating pawl for engaging the ratchet wheel, a plate carried by the ring and adapted to engage the pawl as the ring turns and thus stop the power feed, a projection carried by the ring and a stop for engaging the projection to limit the movement of the ring during hand feeding, the stop serving as a pointer to coöperate with the graduations on the disk to indicate the amount of feed.

In testimony whereof, I hereto affix my signature.

BENGT M. W. HANSON.

It is hereby certified that in Letters Patent No. 1,392,325, granted October 4, 1921, upon the application of Bengt M. W. Hanson, of Hartford, Connecticut, errors appear requiring correction as follows: In the grant and in the heading to the printed specification, title of invention, for "Vertical-Surface-Grinding Machines" read *Surface-Grinding Machines;* page 1, line 6, strike out the word and hyphen "Vertical-"; page 2, line 113, for the word "bearings" read *bearing;* page 7, line 42, for the word "shuck" read *chuck;* and that the said Letters Patent should be read with these corrections therein that the same may conform to the record of the case in the Patent Office.

Signed and sealed this 15th day of November, A. D., 1921.

[SEAL.]

KARL FENNING,
*Acting Commissioner of Patents.*